United States Patent [19]

Markovitz

[11] Patent Number: 5,526,068
[45] Date of Patent: Jun. 11, 1996

[54] OPTICAL PLASTIC AND GLASS LENS ASSEMBLY FOR USE IN AN EYEWEAR FRAME

[75] Inventor: Aaron M. Markovitz, Rochester, N.Y.

[73] Assignee: Bausch & Lomb Incorporated, Rochester, N.Y.

[21] Appl. No.: 307,229

[22] Filed: Sep. 15, 1994

[51] Int. Cl.⁶ .............................. G02C 7/10; G02C 7/12; G02C 5/00
[52] U.S. Cl. .......................... 351/44; 351/49; 351/154; 351/178; 359/819
[58] Field of Search .................... 351/41, 44, 47, 351/48, 49, 62, 83, 86, 106, 154, 158, 166, 178, 172; 359/811, 819

[56] References Cited

U.S. PATENT DOCUMENTS

| 2,540,953 | 2/1951 | Kessler, Jr. | 351/166 |
| 3,195,145 | 7/1965 | Tisher et al. | 359/819 |
| 4,217,037 | 8/1980 | Lemelson | 351/44 |
| 4,338,004 | 7/1982 | Vosper | 351/47 |
| 4,427,271 | 1/1984 | Fogg | 351/154 |
| 4,679,918 | 7/1987 | Ace | 351/163 |
| 5,007,727 | 4/1991 | Kahaney | 351/47 |
| 5,080,475 | 1/1992 | Ferron | 351/57 |
| 5,253,111 | 10/1993 | Chiba | 359/647 |
| 5,312,689 | 5/1994 | Dasher | 428/413 |
| 5,323,191 | 6/1994 | Firtion | 351/159 |

*Primary Examiner*—William L. Sikes
*Assistant Examiner*—Huy Mai
*Attorney, Agent, or Firm*—Katherine McGuire; John E. Thomas

[57] ABSTRACT

A combination lens assembly having optical properties suitable for use in eyewear comprising a glass lens member and a plastic lens member having a rim for holding the glass lens proximate thereto.

14 Claims, 2 Drawing Sheets

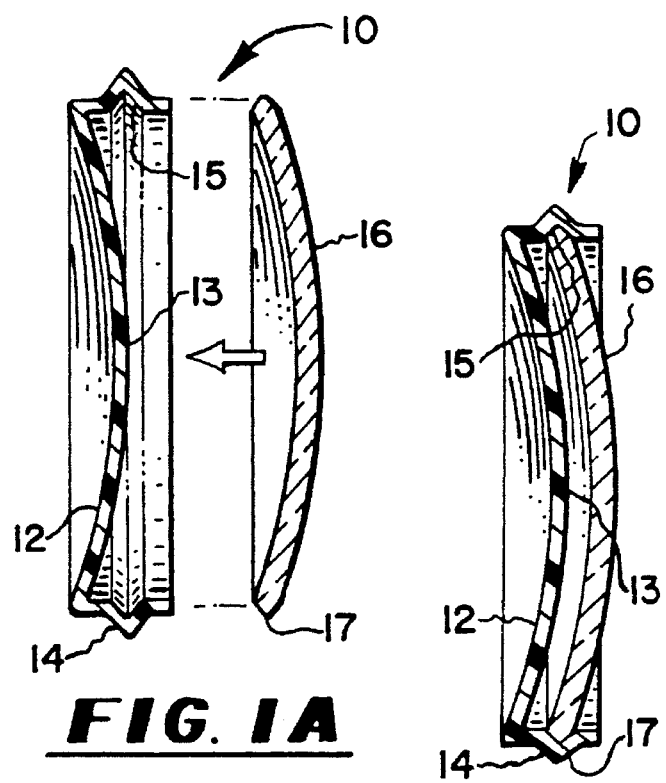
FIG. 1A
FIG. 1B
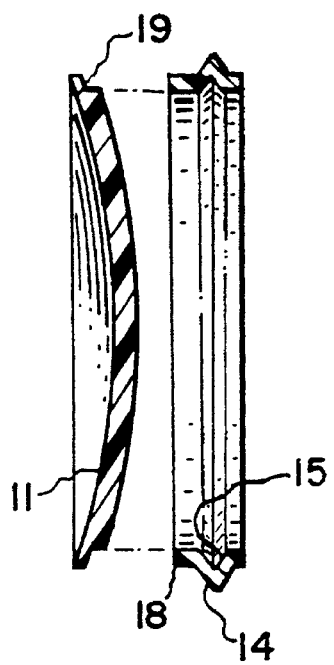
FIG. 2
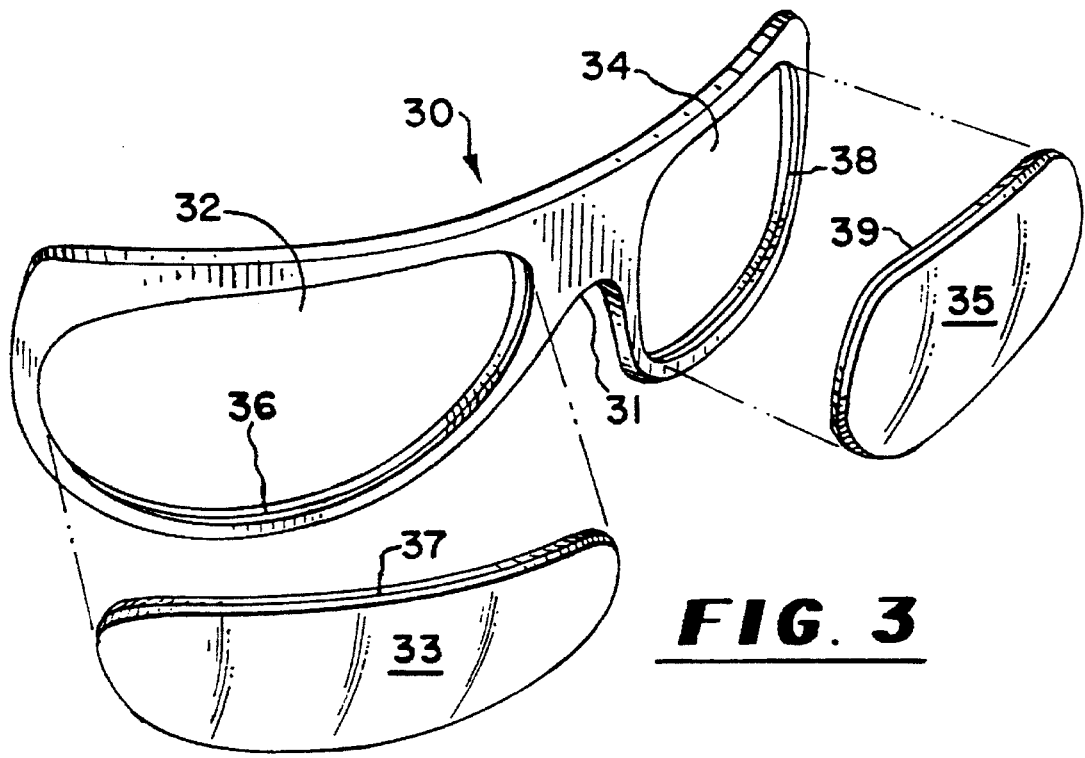
FIG. 3

OPTICAL PLASTIC AND GLASS LENS ASSEMBLY FOR USE IN AN EYEWEAR FRAME

BACKGROUND OF THE INVENTION

1. Field of the Invention

The present invention relates to a combination lens assembly and system useful in eyewear frames, and more particularly, relates to an optical lens assembly which comprises a plastic lens member in combination with a glass lens member.

2. Description of the Art

Eyewear, such as sunglasses or spectacles, have been known and used for hundreds of years. The lenses used in eyewear have conventionally been made of glass and, more recently, been made of various plastic materials such as polycarbonate.

Glass lenses generally have optical benefits, such as optical clarity, and are highly scratch resistant when compared to plastic lenses. However, glass lenses tend to be heavy and are generally less desirable for use during athletic activities since they are not fully shatterproof. Since plastic lenses are light weight and can be made to be substantially impact resistant, they are typically the preferred choice for lenses used with eyewear intended for use during athletic activities. However, plastic lenses generally do not have the optical clarity of glass lenses and have a tendency to scratch easily. Thus, it would be desirable to combine the optical add scratch resistant properties of glass with the light weight and impact resistant properties of plastic in order to have lenses which exhibit the best properties of both materials.

In fact, many attempts have been made to physically combine plastic and glass lenses. Conventional approaches to develop combination lenses typically resulted in laminates or composites which include both plastic and glass components. Generally, the glass and plastic components are held together by means of an organic adhesive such as an epoxy. While this approach would appear simple and straightforward, it has proven to be time consuming and expensive and requires extreme care in selecting proper adhesives in order to avoid stress conditions that develop between the glass component and high expansion plastic components. Thus, laminated or composite lens structures have not proven to be commercially satisfactory.

The present invention provides a unique combination lens assembly which is light weight, safe to wear during any athletic activity, and inexpensive and simple to manufacture.

SUMMARY OF THE INVENTION

The present invention combines the properties of plastic lenses with glass lenses by physically combining plastic and glass lens member in a unique combination lens assembly and system which can be either an independent optical lens element or an optical lens system integrally within an eyewear frame. This approach avoids the numerous problems associated with stress conditions which occur in laminate systems which combine glass and plastic components. The combination lens assembly combines a relatively thin glass lens member having superior optical characteristics with a thin plastic lens member having superior impact resistant characteristics in a lens assembly which does not cement or otherwise chemically adhere the optical portions of the lens surfaces into a single optical element.

Further, the present invention provides for a simple technique for combining plastic and glass lens members in a manner which can be inexpensively manufactured. Moreover, the unique construction of the combination lens assembly provides for numerous optical correction combinations which can virtually meet the needs of any eyewear user. For example, a polarizing film can be employed between the glass lens member and the plastic lens member to construct a simple and inexpensive polarizing combination lens assembly. Further, a corrective glass lens member can be employed with a colored plastic lens member to provide for a simple and inexpensive corrective sunglass combination lens assembly. Alternatively, an optically correcting film can be placed between the lens members to provide a prescription sunglass lens. Last, the space between the glass lens member and the plastic lens member can be filled with an inert gas or drawn with a vacuum in order to substantially limit the tendency for the combination lens assembly to become fogged.

According to this invention, a combination lens assembly is provided comprising a glass lens member and a plastic lens member with integral means for securely holding said glass lens member proximate thereto, said means for holding running around the circumference of said plastic lens member. The combination lens assembly is of optical quality and can be employed in eyewear such as sunglasses and the like.

BRIEF DESCRIPTION OF DRAWINGS

FIG. 1a is a side view of one embodiment of the present invention in an exploded view;

FIG. 1b is a side view of the lens assembly of FIG. 1 assembled;

FIG. 2 is an exploded view of another embodiment of the present invention showing the combination lens assembly;

FIG. 3 is a fight perspective view of a frame front employed in eyewear with the combination lens assembly removed;

DETAILED DESCRIPTION OF THE INVENTION

Figure 4:
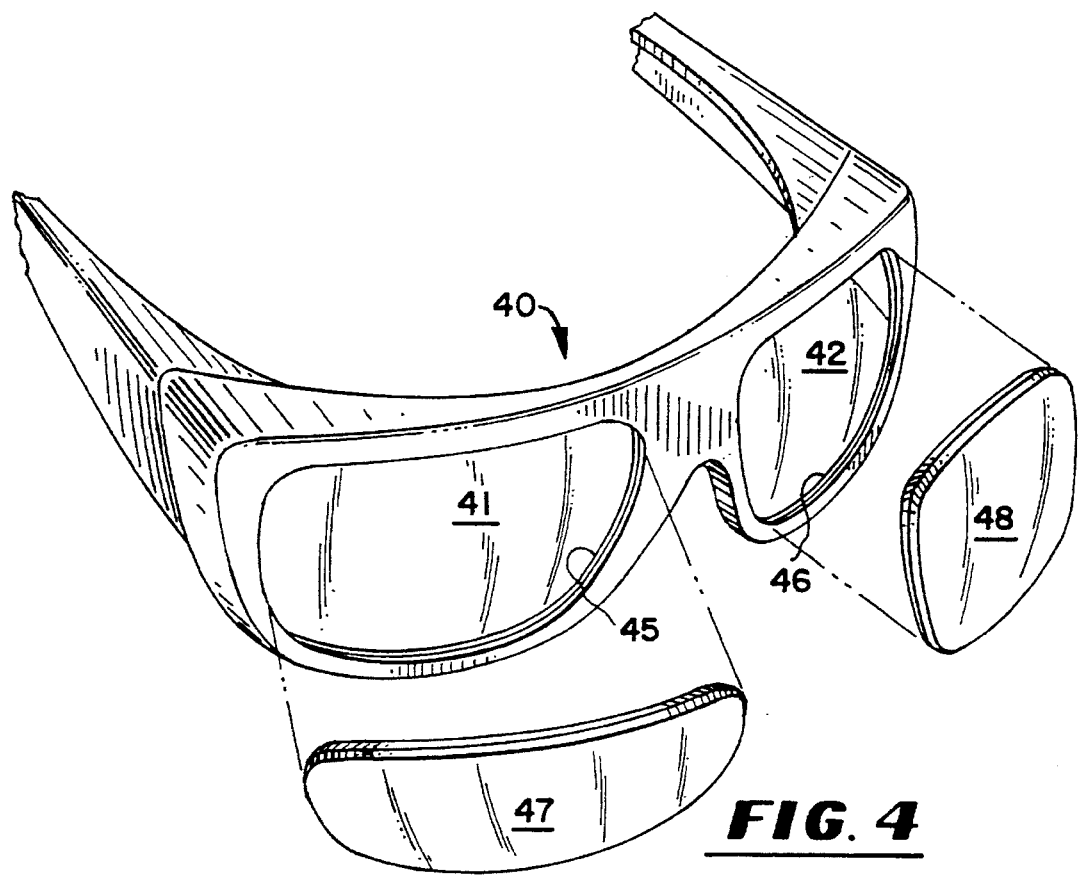
FIG. 4 is a fight perspective view of another eyewear front frame including an integral plastic lens and with the glass lens members removed.

Referring to FIGS. 1a and 1b, a combination lens assembly 10 is shown having a plastic lens member 12 including a lens portion 13, with rim 14 which extends sidewardly around the periphery of plastic lens member 12 and incorporates recess 15. Glass lens member 16 has lens edge 17 which is shaped (such as a tapered-shaped) to fit within recess 15. Glass lens member 16 is positioned on the outside of the lens assembly (concave surface of glass lens member 16 facing the convex surface of lens portion 13 as shown) in order to protect the eyes of the wearer from any glass debris should breakage of the glass lens member occur. Recess 15 and lens edge 17 are preferably designed so to leave an interspace between plastic lens member 12 and glass lens member 16 when assembled.

Both lens portion 13 of plastic lens component 12 and glass lens member 16 should be of optical quality as is generally accepted in the art. For sunglass applications, it is preferred to have the glass lens member tinted to absorb some of the visible and/or ultraviolet light and to decrease transmission through the glass lens member. Any of the known sunglass lens materials, modified to have the desired thickness, optical properties, and edge profile, can be employed.

The plastic members are typically made from a thermoplastic material having suitable optical properties. Examples of such materials include but are not limited to various polycarbonates; acetate, butyrate, and proprionate celluloses; and similar polymers and copolymers. For sunglass applications, the thermoplastic material can be colored using suitable dyes and the like as is well known. Moreover, the plastic member can incorporate optical correction.

According to a preferred embodiment of the present invention as shown in FIGS. 1a and 1b, plastic lens member 12 is molded integrally with rim 14 so as to form a single member. Typically, plastic lens member 12 can be made by any suitable molding technique such as injection molding or compression molding of a suitable thermoplastic material. Injection compression molding is preferably employed when manufacturing plastic lens member 12 in order to obtain a thin lens area of suitably optical clarity and to reduce material stress in the lens area which is associated with optical distortion. Typically, lens portion 13 of plastic lens member 12 will have a thickness of between 0.5 mm and 2 mm. Preferably, lens portion 13 will have a thickness of not more than about 1.0 mm in order to reduce the overall, size of the combination lens assembly for aesthetic purposes.

It has been found that particular care must be employed in manufacturing plastic lens member 12 having rim 14 with recess 15. Since plastic lens member 12 has preferably a thickness of not more than about 1.0 mm, proper molding tools and techniques must be employed in order to remove plastic lens member 12 from the mold tool without damage. Generally, as the depth of recess 15 increases, it becomes more difficult to remove plastic lens member 12 without damage. The depth of recess 15 preferably should not be more than three, percent (3%), more preferably one percent (1%), of the major diameter (taken across the widest point of lens portion 13) of lens portion 13 of plastic lens member 12.

FIG. 2 is another embodiment of the combination lens assembly wherein rim 14 is a separate member containing recess 15 and projection 18. Projection 18 fits into L-shaped receiving area 19 on plastic lens member 11 which is an independent plastic lens member as shown. Rim 14 which is made of a compatible plastic material is affixed to plastic lens member 12 by means of a suitable adhesive or cement or by welding techniques such as ultrasonic welding.

Referring again to FIGS. 1a and 1b, tapered edge 17 of glass lens member 16 is engaged into recess 15. It is important that edge 17 be machined or edged or otherwise formed to closely match recess 15 so as to provide a close fit and to properly set within recess 15. Plastic lens member 12 and glass lens member 16 are preferably positioned so as to leave a space between the, facing surfaces thereof, although, alternatively, these members may be positioned so that the facing surfaces are in contact for certain applications. In either case, the convex surface of plastic lens member 12 is closely matched to conform to concave surface of glass lens member 16. The interfit between edge 17 and recess 15 preferably provides an airtight seal so as to limit foreign particles or moisture from entering into any interspace between plastic lens component 12 and glass lens component 16. The center fit should be secure so as to limit or eliminate movement of the lens member which can remit in damage to either of the lens surfaces. An adhesive may be placed on edge 17 or in recess 15, or another suitable material such as a rubber band or other polymer material can be placed around edge 17, prior to its insertion into recess 15 to act as a gasket to aid in obtaining a secure, airtight interfit. Any other suitable technique can be employed which helps facilitate a secure and, preferably, airtight interfit between edge 17 and recess 15.

Glass lens member 16 is typically from about 0.6 to about 2.5 mm thick with about 1.0 mm to about 1.5 mm being preferred. In a preferred embodiment of the invention, the surface of glass lens member 16 is positioned from about 0.05 mm to about 1.5 mm from the surface of lens portion 13 of plastic lens member 12. While the distance between the lens surfaces can vary, the distance should be substantially constant across the surfaces of the convex side of lens portion 13 and the concave side of the glass lens member 16. Partial contact of these surfaces will lead to optical imperfections and therefore should be avoided.

The glass lens member employed in this invention can be made from any optical grade glass material with or without dyes or other absorptive materials as described above. Moreover, the glass lens member can have surface treatments such as optical coatings, polarizing treatments, surface modifications, electro-conductive coatings and the like on either side of the glass lens member surface. One advantage of this invention is that any such treatment to the lens surface can be protected against physical contact or environmental exposure by placing the desired treatment on the internal surface of the glass lens member (the surface facing the lens portion of the plastic member).

Now referring to FIG. 3, an eyewear frame front 30 has lens areas 32 and 34 and substantially inverted U-shaped area 31 between lens areas 32 and 34 for fitting over the nose of the wearer. Lens area 32 has an internal edge 36 which runs around the internal periphery of lens area 32. Likewise, lens area 34 has internal edge 38. Preferably, internal edges 36 and 38 will be V-shaped recess to accept complimentary V-shaped projections 37 and 39 on lens assemblies 33 and 35 (see numeral 14 of FIG. 1a). Combination lens assemblies 33 and 35 (which are comprised of lens assembly 10 of FIG. 1b) are placed into lens areas 32 and 34, respectively. Combination lens assemblies 33 and 35 are permanently or removably affixed to frame front 30 by the use of a suitable adhesive or by the use of a mechanical fasteners (not shown) as are well known to those skilled in the art.

Frame front 30 may be made of either a plastic material or a metal material suitable for eyewear frame applications. Typically, when frame front 30 is plastic, lens areas 32 and 34 will be temporarily enlarged, using known techniques, to facilitate inserting rims 37 and 39 of combination lens assemblies 33 and 35 into the recess of integral edges 36 and 38. Lens areas 32 and 34 will contract due to the resiliency of the frame material to firmly hold rims 37 and 39.

When frame front 30 is metal, lens areas 32 and 34 can be opened and closed through the use of conventional frame systems and conventional fasteners (not shown). Rims 37 and 39 will be inserted into the V-shaped recess of internal edges 36 and 38 when lens areas 32 and 34 are in the open position. Lens areas 32 and 34 are then closed holding lens assemblies 33 and 34 in position in the convention manner.

FIG. 4 illustrates another embodiment of this invention wherein frame front 40 and plastic lenses 41 and 42 are integrally molded to in a single member. Plastic lenses 41 and 42 are made of the same thermoplastic material as frame front 40 and are manufactured from a single mold or as an integral unit. Frame from 40 will contain V-shaped recesses 45 and 46, similar to recess 15 as shown in FIG. 1a, which can receive the edge of two glass lens members 47 and 48, respectively. Recesses 45 and 46 can be molded into frame front 40 at a position which is proximate to plastic lenses 41 and 42 or frame front 40 can be machined or otherwise cut after molding by conventional techniques to incorporate recesses 45 and 46 to receive the glass lens members 47 and 48. Frame front 40 is connected to two rearwardly extending temples in a conventional manner.

Figure 5:
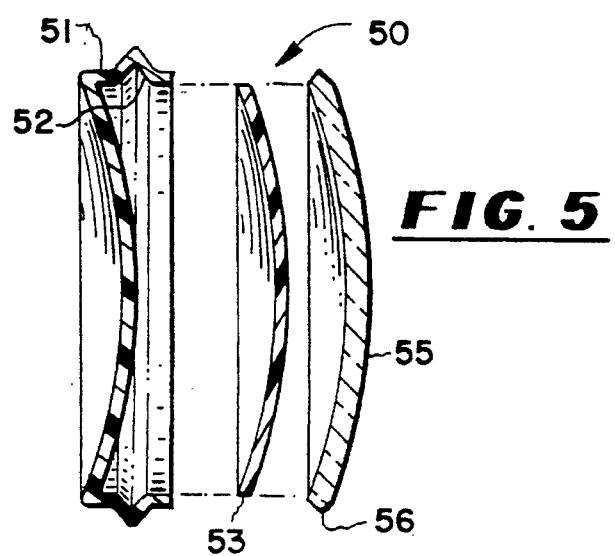
FIG. 5 is a side exploded view of yet another combination lens assembly of this invention.

FIG. 5 illustrates yet another embodiment of combination lens assembly which additionally employs a polymeric film material having certain optical properties. In this exploded view, combination lens assembly 50 is comprised of plastic lens member 51, film 53, and glass lens member 55 In accordance with the construction of combination lens assembly 50, film 53 is cut to fit within the interspace created between plastic lens member 51 and glass lens member 55. Film 53, having substantially the same peripheral shape of glass lens member 55 is placed against glass lens member 55. This assembly is then placed against the lens portion of plastic lens member 51 wherein edge 56 is engaged within recess 52.

Film 53 can be a polarizing film, an optical correction film or a film of any composition capable of providing the desired spectral modifications to the transmitted light. Examples of suitable polarizing films include but are not limited to those sold by American Polarizers, Inc. of Reading, Pa., and Polaroid Corporation of Norwood, Mass. Examples of optical correction films include but are not limited to those sold by 3M Health Care Specialties Division under the trademark PRESS ON OPTICS® (see U.S. Pat. No. 3,628,854). The films can be held in place by the surface tension characteristics of the film when wetted with a suitable solvent such as water.

The use of optical correcting films can be employed as a simple and easy means of providing an optically correcting sunglass. The combination lens assembly of this invention provides for placing optically corrective films into the assembly and ultimately the sunglasses at the point of purchase. This allows consumers to select other preferred lenses and frames at the point of purchase and have prescription sunglasses made to order while they wait.

In still another embodiment of this invention, the combination lens assembly of this invention can be manufactured in a suitable gas chamber, for example an inert gas atmosphere, in order to provide inert gas between plastic lens member 12 and glass lens member 16 of FIG. 1a. In tiffs embodiment, it will be important to maintain an airtight seal between recess 15 and edge 17 in order to maintain inert gas between plastic lens member 12 and glass lens member 16.

Although only a few embodiments of the present invention have been shown above, the subject invention is not intended to be limited by these embodiments, but shall include all modifications and variations that fall within the scope of the attached claims. There are multiple combinations of lenses and films that can be employed within this invention as will be evident to one skilled in the art.

We claim:

1. An optical lens assembly for use in an eyewear frame comprising a glass lens member and a plastic lens member, said plastic lens member including a sidewardly extending rim having a recess formed therein, said rim extending around a periphery of said plastic lens member, a periphery of said glass lens member secured in said recess, said glass member being spaced about 0.05 to about 1.5 mm from said plastic lens member.

2. The optical lens assembly of claim 1 wherein a film is placed between said plastic lens member and said glass lens member.

3. The optical lens assembly of claim 2 wherein said film is a polarizing film.

4. The optical lens assembly of claim 2 wherein said film is an optical correction film.

5. The lens member of claim 1 wherein said rim forms an air tight seal around the periphery of said glass lens member.

6. The optical lens assembly of claim 1 wherein said lens portion has a thickness of between 0.5 mm and 2 mm.

7. The optical lens assembly of claim 6 wherein said glass lens member has a thickness of between about 0.6 mm and about 2.5 mm.

8. The optical lens assembly of claim 7 wherein said glass lens member comprises a sunglass lens.

9. The combination lens assembly of claim 1 wherein a gasket is inserted within said recess prior to inserting the periphery of said glass lens member into said recess.

10. The combination lens assembly of claim 1 wherein the distance between said plastic lens and said glass lens member is substantially constant.

11. The combination lens assembly of claim 1 wherein said recess has a depth of not more than 3% of the major diameter of the lens surface of said plastic lens.

12. The combination lens assembly of claim 1 wherein the air space between said plastic lens member and said glass lens member is filled with an inert gas.

13. The combination lens assembly of claim 1 wherein said plastic lens incorporates optical correction.

14. The combination lens assembly of claim 1 wherein the rim is integral with said plastic lens member.

* * * * *